UNITED STATES PATENT OFFICE.

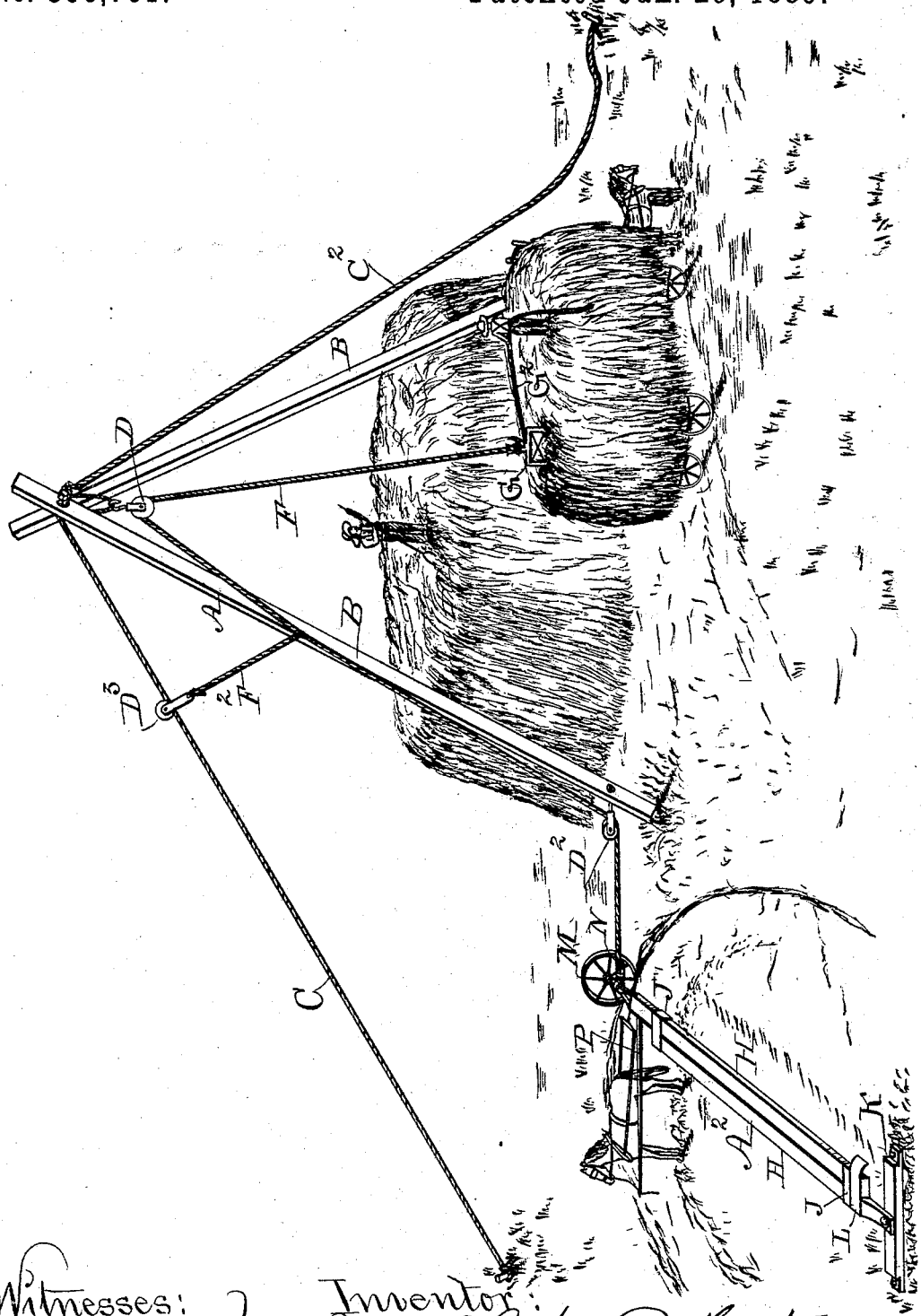

LUTHER B. MORTON, OF STUART, IOWA.

HAY-STACKER.

SPECIFICATION forming part of Letters Patent No. 396,761, dated January 29, 1889.

Application filed January 21, 1888. Serial No. 261,547. (No model.)

*To all whom it may concern:*

Be it known that I, LUTHER B. MORTON, a citizen of the United States of America, and a resident of Stuart, in the county of Guthrie and State of Iowa, have invented an Apparatus for Stacking Hay, of which the following is a specification.

My object is to save time, labor, and expense in stacking hay and straw; and my invention consists in the construction and combination of a portable oscillating derrick, an extensible sweep, and ropes and pulleys, as hereinafter set forth, pointed out in my claims, and illustrated in the accompanying drawings, in which—

A represents my portable derrick, composed of two straight pieces of timber, B, that are pivoted together at their top ends by means of a screw-bolt or in any suitable way that will allow them to be folded into parallel position or spread apart at their lower ends to any distance desired.

C and $C^2$ are guy-ropes fixed to the opposite sides of the top of the derrick and fastened to the ground by means of stakes or in any suitable way, so as to prevent the derrick from falling, but allow its top to swing from side to side.

D is a pulley suspended from the top of the derrick.

F is a rope passed over the pulley D to operate a fork, G, attached to its free end.

$G^2$ is a rope attached to the trip mechanism of the fork.

$D^2$ is a pulley attached to the lower end of one of the timbers B, and the rope F is passed over the pulley, to be directed thereby relative to a sweep, as required in raising and lowering the fork.

$A^2$ represents my extensible sweep, composed of two straight pieces of wood, H, that are connected by means of metal loops J, fixed to their ends to reciprocally hold each other together and to allow them longitudinal movement for the purpose of lengthening and shortening the complete sweep at pleasure, as required to operate the apparatus successfully in elevating hay to different heights as the building of a stack progresses, or in operating a fork and carrier in a barn.

K is a block pivoted to the end of the sweep and adapted to be fastened firmly to the surface of the ground by means of stakes or in any suitable way.

L represents a shield fixed to the pivoted end of the sweep in such a manner that it will prevent ropes from engaging the loop J as the sweep is operated and the ropes drawn over its center of motion.

M is a wheel on an axle formed on or fixed to the end of one of the pieces H of the sweep to support the free end of the sweep and facilitate its operation.

N represents a rope-fastening device that has a swivel-connection with the end of the sweep.

$F^2$ is a rope fixed to the rope F and connected with a pulley, $D^3$, that travels on the guy-rope C.

P represents a pole and hitching device connected with the free end of the sweep in such a manner that a horse can be attached to operate the sweep.

In the practical use of my apparatus thus constructed and set up, as shown, I hitch a horse to the sweep $A^2$, insert the fork G in the hay on a wagon or on the ground, and then start the horse. As the horse moves outward relative to the derrick, the fork and hay held thereby will be elevated as the rope F is drawn out by the movement of the sweep, and the slack in the rope $F^2$ will also be drawn out, so that it will be stretched taut before the horse turns toward the sweep in his circular path and pull upon the tight guy-rope C, to thereby swing the top of the derrick and the fork and hay pendent therefrom over the position where the hay is to be dropped to form a stack. As the derrick and hay are thus swung laterally, the rope $C^2$ is drawn taut and restricts the lateral motion of the derrick and hay, and when the fork and hay have been thus elevated and carried laterally I pull upon the trip-rope $G^2$ to allow the hay to drop from the fork, and as the horse then advances and steps over the rope F and the fork descends I pull the fork to me and again fasten it in the hay while the rope $F^2$ is being drawn taut, and as soon as the horse begins to pull on the rope $F^2$ after it is taut it will draw in the rope F, and thereby reverse the lateral motion of the top of the derrick and bring it immediately over the loaded fork that is to be elevated again. The fork can be thus repeatedly filled and elevated and the derrick vibrated at each revolution of the horse to carry hay and discharge it to build a stack as the horse intermittently pulls upon the ropes while continuously moving in his circular endless track. As the stack rises, the fork must necessarily be elevated higher before the trip-rope is pulled to discharge the hay from the fork.

I am aware that a derrick of similar construction has been operated by means of guy-ropes to move hay and other things suspended thereby from one place to another, and that sweeps and hay-forks are common and used for similar purposes; but my manner of arranging and combining a sweep with guy-ropes and a derrick to operate a fork is novel and greatly advantageous in stacking hay.

I claim as my invention—

1. A derrick composed of two straight pieces pivoted together at their top ends, two guy-ropes fixed to the top of the derrick, a pulley attached near the top of the derrick, a pulley attached to the lower end of one of the said pieces in the derrick, and a traveling pulley on one of said guy-ropes, a pivoted sweep, and two ropes arranged and combined in the manner shown and described to operate a hay-fork, as and for the purposes stated.

2. A sweep composed of two straight bars, H, each having a fixed loop, J, a pivot, K, a shield, L, a wheel, M, and a hitching device, P, substantially as shown and described, for the purposes stated.

LUTHER B. MORTON.

Witnesses:
J. E. MARSHALL,
F. A. AGNEW.